United States Patent Office.

HENRY FAKE, OF BROOKLYN, ASSIGNOR TO HIMSELF AND CHARLES A. TODD, OF NEW YORK, N. Y.

Letters Patent No. 105,788, dated July 26, 1870.

IMPROVEMENT IN RECTIFYING WHISKY, &c.

The Schedule referred to in these Letters Patent and making part of the same.

*To all whom it may concern:*

Be it known that I, HENRY FAKE, of the city of Brooklyn, in the county of Kings and State of New York, have invented a new and improved Process of Rectifying Whisky during Distillation; and I do hereby declare that the following is a full, clear, and exact description thereof, which will enable others skilled in the art to make and use the same.

This invention relates to a new method of withdrawing the fusel-oils from their intimate combination with whisky, while the same is in the process of distillation.

The separate process of rectification is thereby avoided, and whisky without any traces of fusel-oil is produced.

This invention consists in adding to the mash, while it is in a state of fermentation, a suitable quantity of ivory black and charcoal, in proportions and at a period hereinafter stated.

To enable others skilled in this art to use my improvement, I will proceed to describe the same.

Corn, or other suitable grain, in proper quantities, is ground and formed into mash by the ordinary means, and is allowed to ferment, as is usual.

At a period of about four hours less than the common duration of fermentation, I add to the beer or mash the following ingredients:

For two hundred bushels of grain in the mash I use about twenty pounds of ivory black and about fifty pounds of pulverized charcoal, and the whole added to the mash at the above-stated period of its fermentation. (I say about the above-named quantities, as it is impossible to be exact, for the reason that scarcely any two distillers use precisely the same process in distilling; consequently the quantities of the ingredients must be varied somewhat to produce the same result in every case.)

The beer or mash, with the ivory black and charcoal added, is allowed to stand and ferment about four hours, and is then let down to the receiving-cistern, and the process of distillation proceeds in the ordinary manner.

By this process the ivory black, with the phosphate and carbonate of lime contained therein, acts upon the fusel-oil, separating it from the grain during the distillation. The charcoal then takes it up, purifies the liquor, and leaves it in a perfectly deodorized state.

Besides reducing the cost of what is termed pure spirits, by obviating the necessity of a separate rectification, I am enabled, by my process, to produce five per cent. more whisky from a given quantity of mash than can be obtained by the old and common processes.

What I claim is—

The process herein described, for producing rectified whisky, the same consisting in treating the beer or mash by means of ivory black and charcoal, substantially as set forth.

HENRY FAKE.

Witnesses:
P. M. PREATER, Jr.,
W. ROWLAND.